(12) United States Patent
Han et al.

(10) Patent No.: US 7,288,747 B2
(45) Date of Patent: Oct. 30, 2007

(54) COOKING APPARATUS

(75) Inventors: Dae-sung Han, Hwaseong-si (KR);
Han-seong Kang, Suwon-si (KR);
Yong-hyun Kwon, Suwon-si (KR);
Chul Kim, Yongin-si (KR); Han-jun Sung, Suwon-si (KR); Tae-uk Lee, Suwon-si (KR); Seong-deok Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/283,758

(22) Filed: Nov. 22, 2005

(65) Prior Publication Data

US 2006/0151470 A1    Jul. 13, 2006

(30) Foreign Application Priority Data

Jan. 5, 2005    (KR) ...................... 10-2005-0000774

(51) Int. Cl.
*H05B 3/68*    (2006.01)
*F24F 7/00*    (2006.01)

(52) U.S. Cl. .................................. 219/450.1; 454/305

(58) Field of Classification Search ............ 219/443.1, 219/449.1, 450.1, 451.1, 452.11, 452.12; 99/372–382, 422–425, 444, 445, 401; 454/305–327; 126/211, 217, 218; 220/360, 366.1, 367.1, 220/745
See application file for complete search history.

(56) References Cited

U.S. PATENT DOCUMENTS

| 3,500,739 A | * | 3/1970 | Dry ............................ 454/318 |
| 3,757,671 A | * | 9/1973 | Warshauer et al. ........... 99/400 |
| 6,363,842 B1 | * | 4/2002 | Lin ............................ 99/425 |
| 2002/0046749 A1 | | 4/2002 | Leutner et al. |
| 2004/0089163 A1 | | 5/2004 | Elwedini |

FOREIGN PATENT DOCUMENTS

| DE | 31 38 171 | 4/2003 |
| EP | 1 444 934 | 8/2004 |
| KR | 10-0046587 | 11/1990 |
| KR | 1020040071026 | 8/2004 |

OTHER PUBLICATIONS

European Search Report/Office Action in corresponding Patent Application No. 05111862.8-2313 dated May 10, 2006.
Search Report/Office Action in corresponding Korean Patent Application No. 10-2005-0000774 mailed May 26, 2006.

* cited by examiner

*Primary Examiner*—Sang Paik
(74) *Attorney, Agent, or Firm*—Staas & Halsey LLP (57) ABSTRACT

A cooking apparatus having a grill part to cook food thereon, and a grill housing coupled with the grill part. The cooking apparatus includes a cover member coupled with the grill housing, to cover the grill part, and having an opening part, and at least one opening and closing member coupled with the cover member, to open and close the opening part.

9 Claims, 8 Drawing Sheets

COOKING APPARATUS

CROSS-REFERENCE TO RELATED APPLICATIONS

This application claims the benefit of Korean Patent Application No. 2005-0000774, filed on Jan. 5, 2005, in the Korean Intellectual Property Office, the disclosure of which is incorporated herein by reference.

BACKGROUND OF THE INVENTION

1. Field of the Invention

The present invention relates to a cooking apparatus and, more particularly, to a cooking apparatus having a cover member whose opening part is opened and closed by an opening and closing member.

2. Description of the Related Art

Conventionally, "grilling" refers to a method of broiling meats, fishes or shellfishes, etc. on a gridiron or directly roasting skewered meats or fishes on the fire. A grill device is a device used to broil the meats using electricity or gas, etc.

Figure 6:
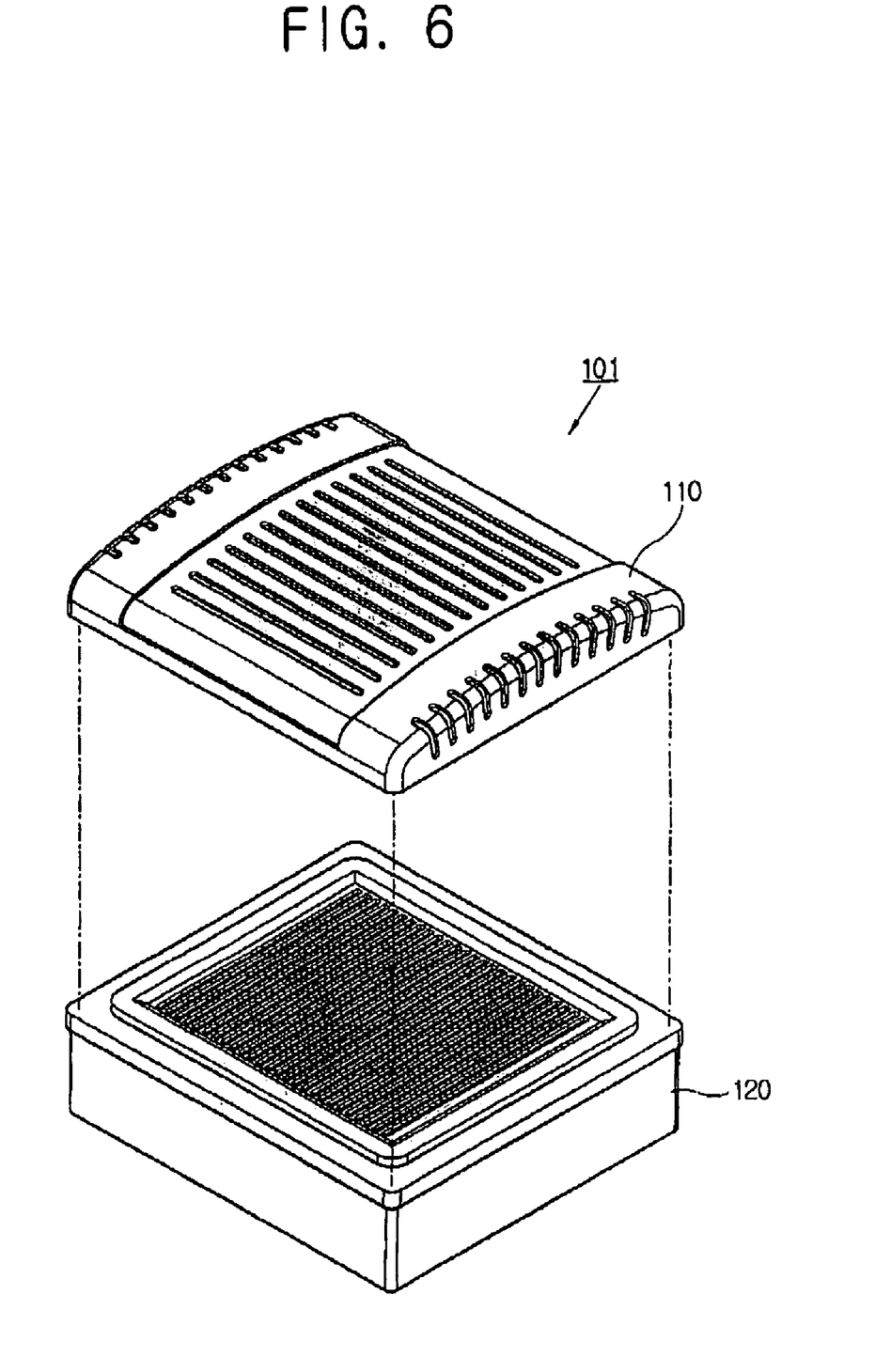
FIG. 6 is a perspective view illustrating a conventional grill device having a cover to be disconnected therefrom.
Figure 7:
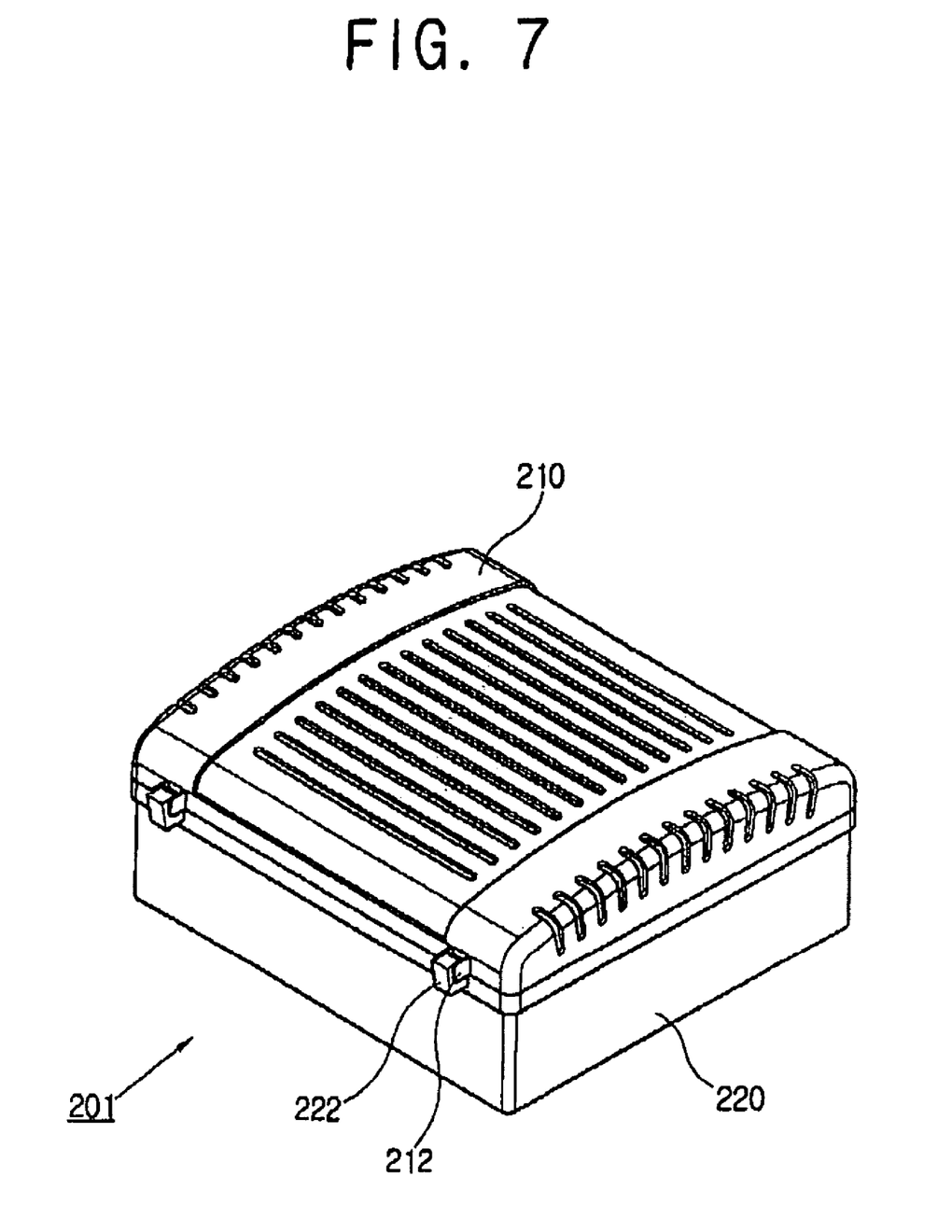
FIG. 7 is a perspective view illustrating the conventional grill device having a cover rotatably mounted thereon.

The grill device includes a grill cover to increase a cooking efficiency. The grill cover can be opened and closed as necessary. In FIG. 6, a conventional grill device 101 includes a grill cover 110 connectable to and disconnectable from a main body 120. In FIG. 7, a conventional grill device 201 includes a grill cover 210 having a hinge shaft 212 whereby the grill cover 210 is rotatable relative to a main body 220 having a hinge shaft receiving part 222.

In the conventional grill device 101, the grill cover 110 is disconnected from the main body 120, and in the conventional grill device 201, the grill cover 210 is opened in a rotatable manner so as to discharge air generated while cooking, out of the main body 120 and the main body 220, respectively or to determine a state of the food being cooked.

The grill cover 110 and the grill cover 210 do not provide a means to discharge the air generated while cooking, out of the main body 120 and the main body 220, respectively or to determine a state of the food being cooked within the main body 120 and the main body 220, respectively in an easy manner, without disconnecting the grill cover 110 from the main body 120 or without rotating the grill cover 210 from the main body 220.

SUMMARY OF THE INVENTION

Accordingly, it is an aspect of the present invention to provide a cooking apparatus including a cover member having an opening part, and an opening and closing member to open and close the opening part.

Additional aspects and/or advantages of the invention will be set forth in part in the description which follows and, in part, will be apparent from the description, or may be learned by practice of the invention.

The foregoing and/or other aspects of the present invention are achieved by providing a cooking apparatus having a grill part to cook food thereon, and a grill housing coupled with the grill part, the cooking apparatus including a cover member coupled with the grill housing, to cover the grill part, and having an opening part to discharge air from the cooking apparatus, and at least one opening and closing member coupled with the cover member, to open and close the opening part.

The opening and closing member includes a plurality of blades disposed in parallel at predetermined intervals.

The cooking apparatus further includes a pair of support frames coupled with edges of the opening part, thereby centering the opening part between the support frames, and a rotation supporting part coupling end regions of each blade rotatably to the pair of support frames.

The rotation supporting part includes a plurality of rotation holes formed separately from each other along a lengthwise direction of each support frame, and rotation projections provided on each blade, being rotatably received in the rotation holes.

The cooking apparatus further includes an angle adjusting part connected to the plurality of blades, adjusting a degree of an inclination angle of each blade to the cover member.

The angle adjusting part includes a pair of sliders slidably coupled with the support frames, and a coupling part coupling end regions of each blade with the pair of sliders.

The coupling part includes a plurality of coupling holes formed separately from each other along a lengthwise direction of the slider, and a coupling projection provided on each blade, being inserted into the coupling hole.

The angle adjusting part further includes a manipulation knob connected with each slider and manipulating the respective slider to slide.

The cooking apparatus further includes an electric heater generating heat to be used for cooking food, wherein the plurality of blades are disposed in a direction of crossing the electric heater.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below so as to explain the present invention by referring to the figures.

Figure 1:
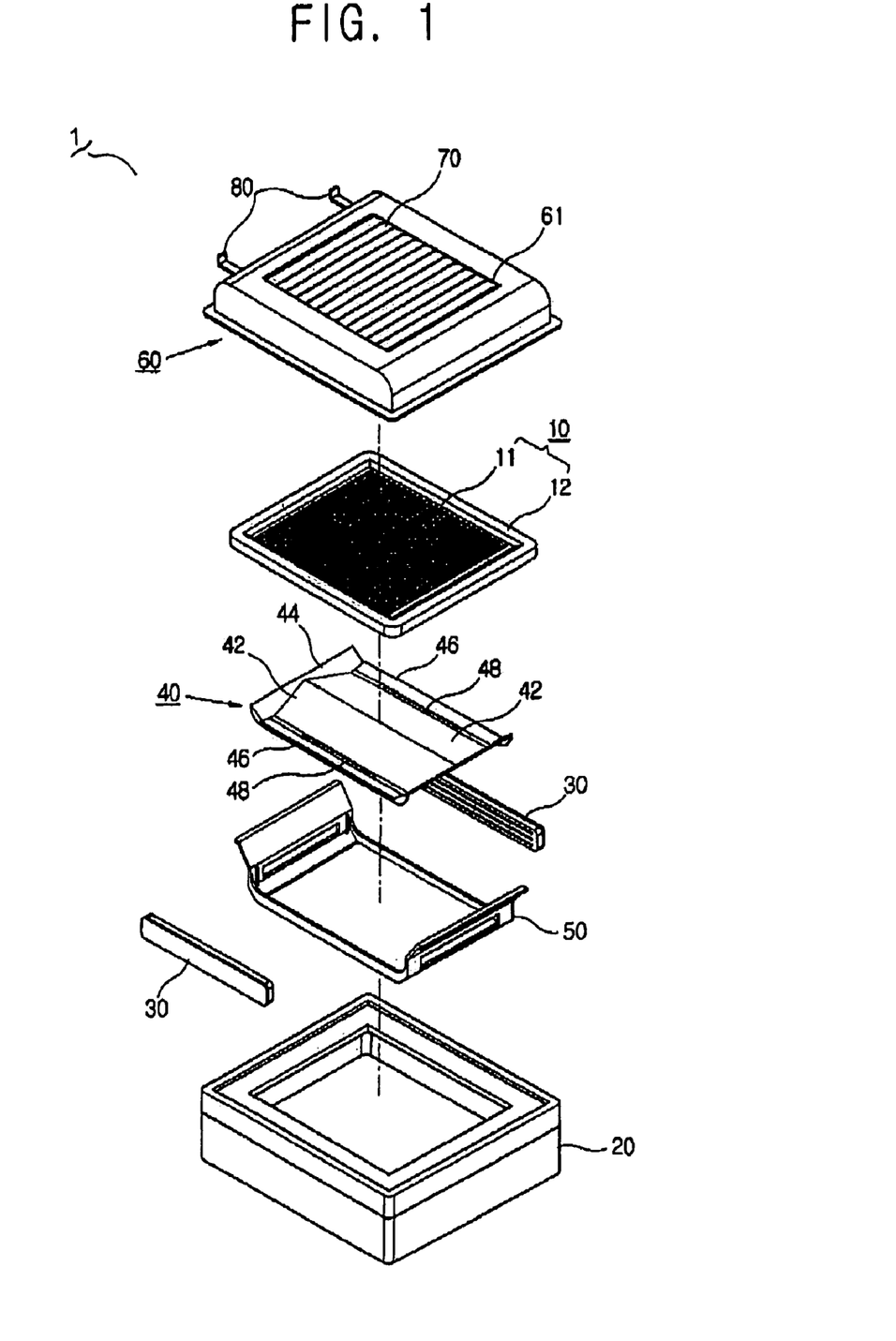
FIG. 1 is an exploded perspective view illustrating a cooking apparatus according to an embodiment of the present invention.

In FIG. 1, a cooking apparatus 1 according to an embodiment of the present invention comprising a grill part 10 on which food is cooked, a grill housing 20 coupled with a lower part of the grill part 10, receiving therein a variety of parts and accessories, and a cover member 60 covering the grill part 10, and having an opening part 61 formed on a top portion thereof.

The grill part 10 directly contacting and cooking food is coupled with an upper part of the grill housing 20. The grill part 10 comprising a plurality of grill bars 11 disposed at predetermined intervals so as to make food safely seated thereon, and a support frame 12 supporting the plurality of grill bars 11 along a circumferential direction.

The grill housing 20 supports the lower part of the grill part 10 mounted on an upper opening part thereof, inside of which a heating space is formed. Inside the grill housing 20 are received electric heaters 30 as heating sources, a grill reflecting member 40 reflecting heat from the electric heaters 30, and an oil collector 50 collecting oil in a lower part of the grill reflecting member 40.

The electric heaters 30 are installed oppositely to each other on side walls inside the grill housing 20 so that they are disposed in the lower part of the grill part 10. The heat generated in the electric heaters 30 is transmitted to the grill part 10 by the grill reflecting member 40.

The grill reflecting member 40 comprising a W-shaped section. The grill reflecting member 40 comprising metallic materials having a good thermal conductivity so as to reflect the heat generated from the electric heaters 30 and then transmit the heat to the grill part 10.

The grill reflecting member 40 comprising a pair of first reflection faces 42 interconnected in a center of the grill reflecting member 40, auxiliary reflection faces 46 formed oppositely to the first reflection faces 42, and a second reflection face 44 extended from ends of the first reflection faces 42 and the auxiliary reflection faces 46.

The first reflection faces 42 are disposed in a direction of emitting the heat from the electric heaters 30, that is, in front of the electric heaters 30, to thereby reflect the heat generated from the electric heaters 30 to the grill part 10 in a bent manner.

The auxiliary reflection faces 46 are adjacent to the electric heaters 30, for which their temperatures become high while the cooking apparatus 1 is in operation. The auxiliary reflection faces 46 comprise bent side plate parts on ends thereof, which are coupled with the oil collector 50.

An oil guiding hole 48 penetrates between the auxiliary reflection faces 46 and the first reflection faces 42, which guides oil coming out of the food being cooked in a downward direction. Accordingly, the oil passing through the oil guiding hole 48 is collected in the oil collector 50 disposed in the lower part of the grill reflection member 40.

The second reflection face 44 is disposed laterally to the heat emitting direction of the electric heaters 30. The second reflection face 44 is smoothly curved so as to allow the heat generated from the electric heaters 30 to be reflected to the grill part 10 in a bent manner.

The cover member 60 opening and closing the top of the grill part 10 comprises a plurality of blades 70 as an opening and closing member for opening and closing the opening part 61 of the cover member 60, and an angle adjusting part (to be described later) connected to the plurality of blades 70, adjusting a degree of inclination angle of each blade 70 to the cover member 60.

Inside the cover member 60 are provided a pair of support frames 74 (see FIG. 4A) coupled to edges of the opening part 61, centered between the pair of support frames 74. End regions of each blade 70 are rotatably coupled with the pair of support frames 74 by rotation supporting parts (to be described later). Here, each blade 70 is disposed in a direction of crossing the electric heaters 30, whereby the heat from the electric heaters 30 is suppressed from being externally discharged from the cover member 60.

Figure 5:
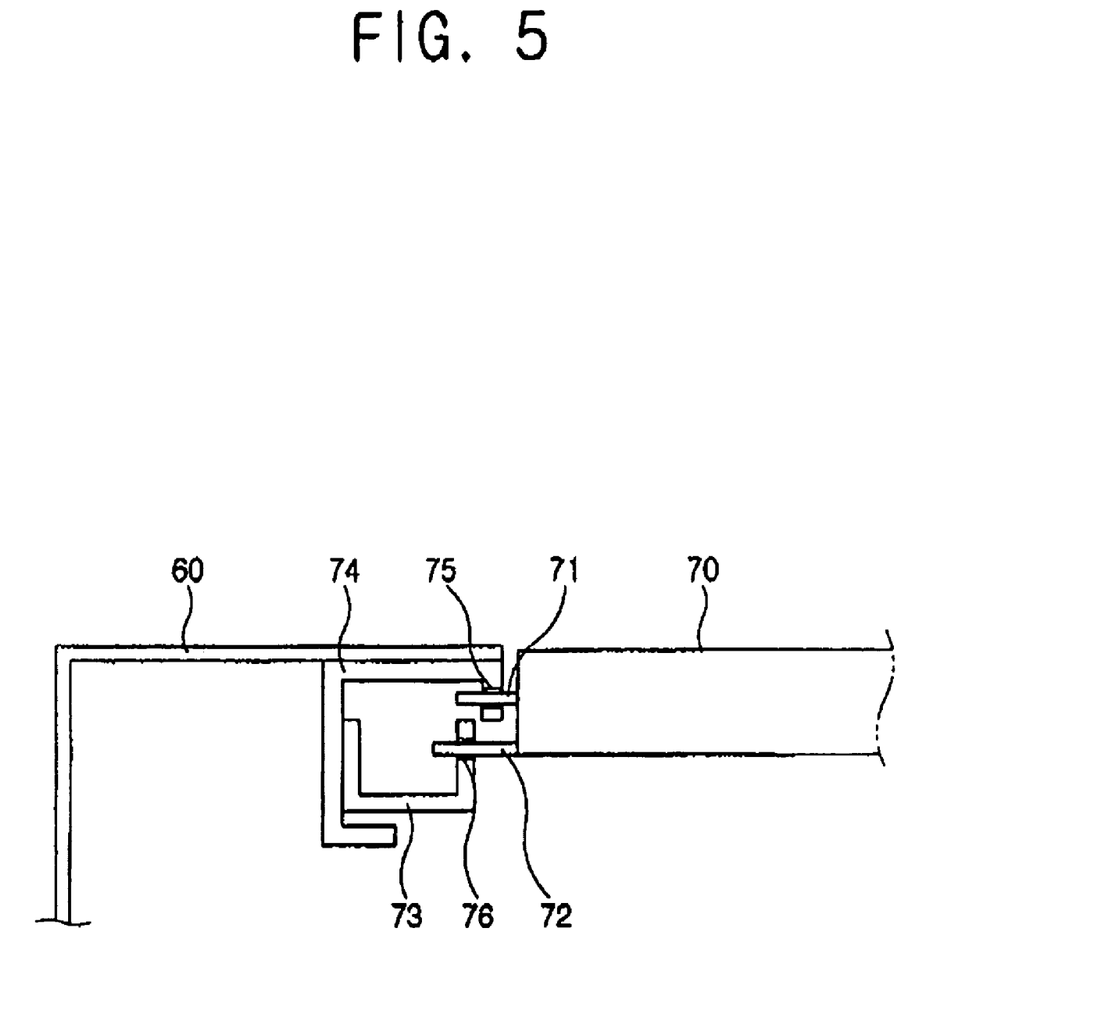
FIG. 5 is a sectional view schematically illustrating a region on which a coupling part and a rotation supporting part are installed on the cover member shown in FIG. 1, in accordance with an embodiment of the present invention.

In FIG. 5, each rotation supporting part comprises a plurality of rotation holes 75 formed separately from each other along the lengthwise direction of the support frame 74, and a rotation projection 71 provided on each blade 70, being received rotatably in the rotation holes 75.

The angle adjusting part comprises a pair of sliders 73 slidably coupled with the support frame 74, a coupling part coupling end regions of each blade 70 with the pair of sliders 73, and a manipulation knob 80 connected to each slider 73, whereby sliding of the slider 73 can be manipulated. Here, each manipulation knob 80 is extended from the respective sliders 73 and exposedly disposed externally to the cover member 60 through a opening part 61 formed through the cover member 60.

The coupling part, as shown in FIG. 5, comprises a plurality of coupling holes 76 formed separately from each other along the lengthwise direction of the sliders 73, and a coupling projection 72 provided on each blade 70, being inserted into the corresponding coupling hole 76.

In the cooking apparatus with this configuration, an opening and closing operation of the blade 70 provided on the cover member will be described as follows.

Figure 2:
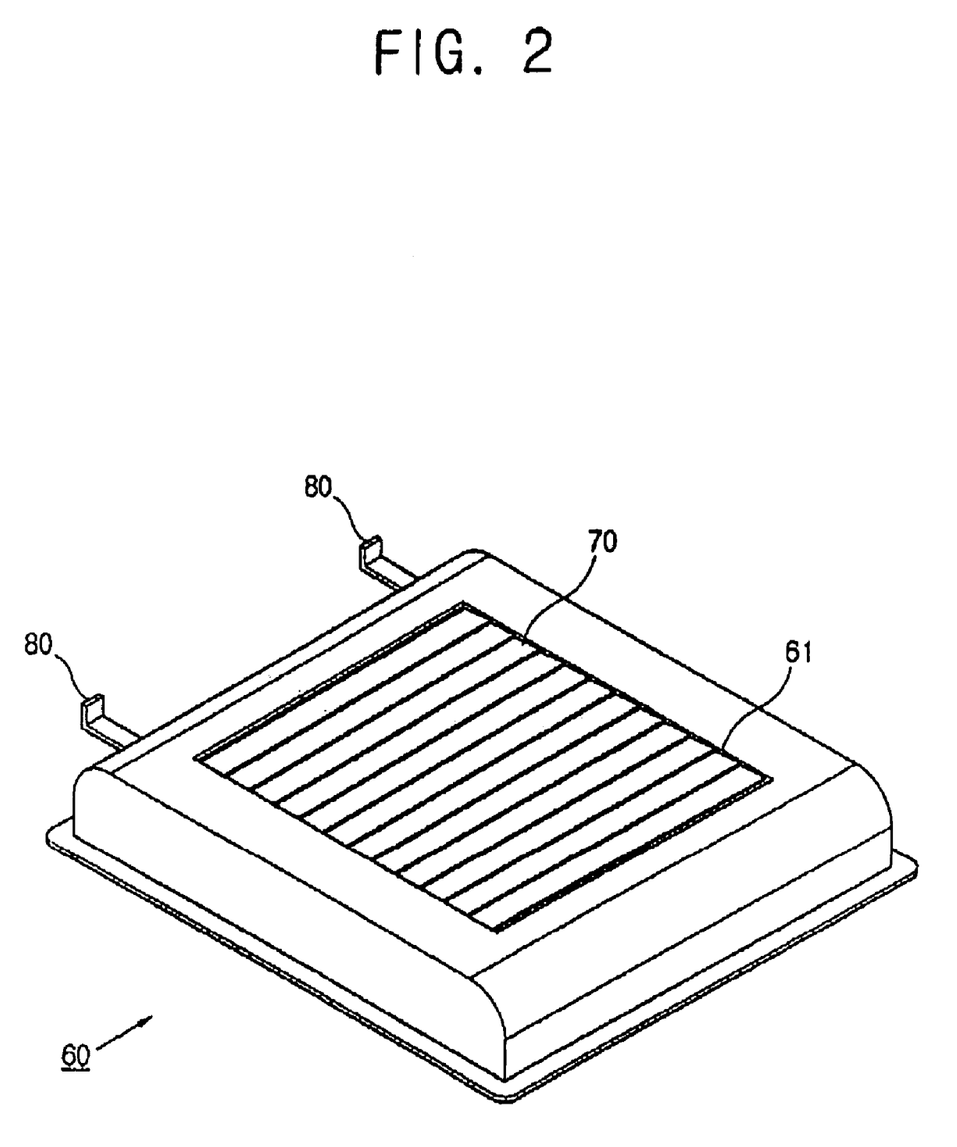
FIG. 2 illustrates an opening part of a cover member of the cooking apparatus shown in FIG. 1, in a closed state, according to an embodiment of present invention.
Figure 4A:
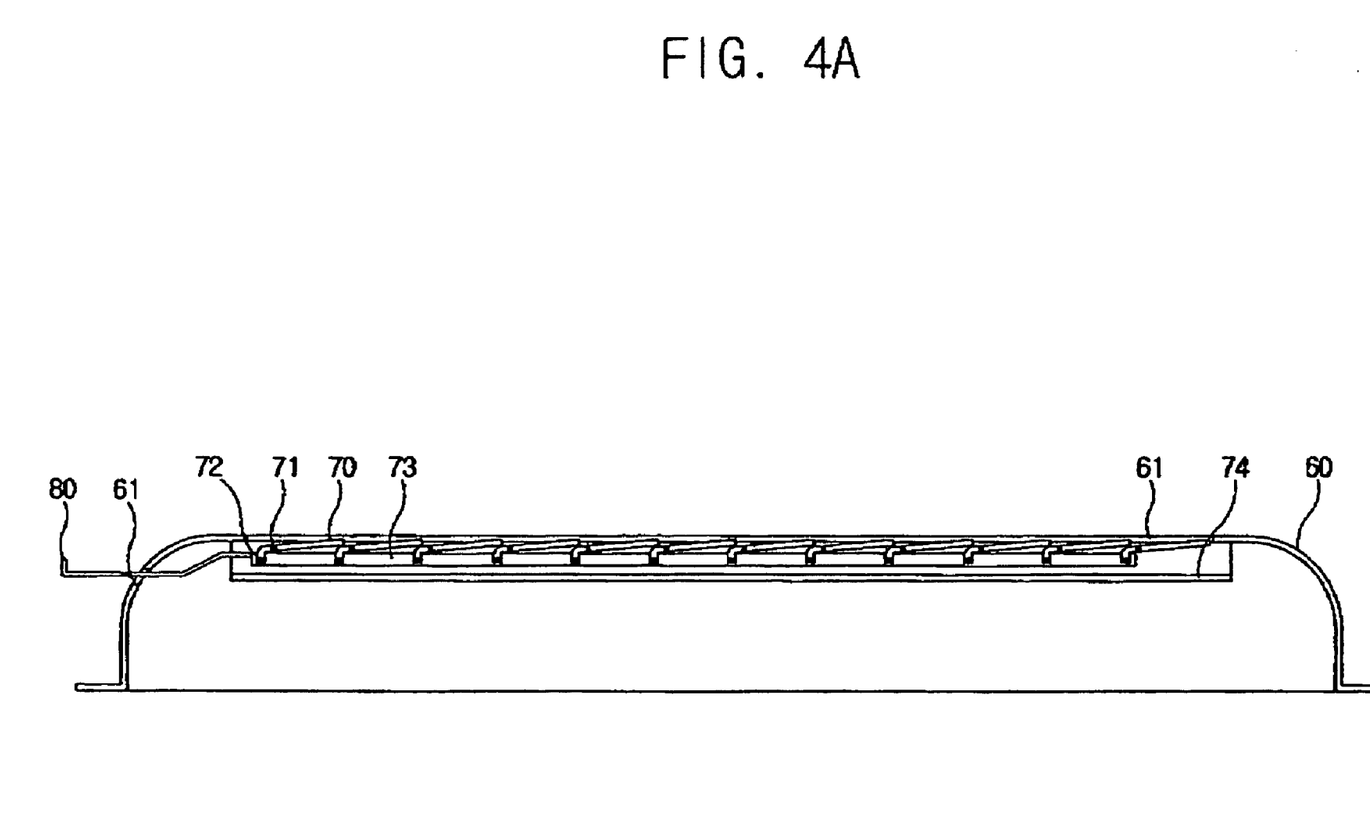
FIGS. 4A and 4B are side sectional views schematically illustrating closing and opening operations of a blade of the cover member shown in FIG. 1, according to an embodiment of the present invention.

As shown in FIGS. 2 and 4A, the opening part 61 of the cover member 60 is closed by the plurality of blades 70 when cooking food.

Figure 3:
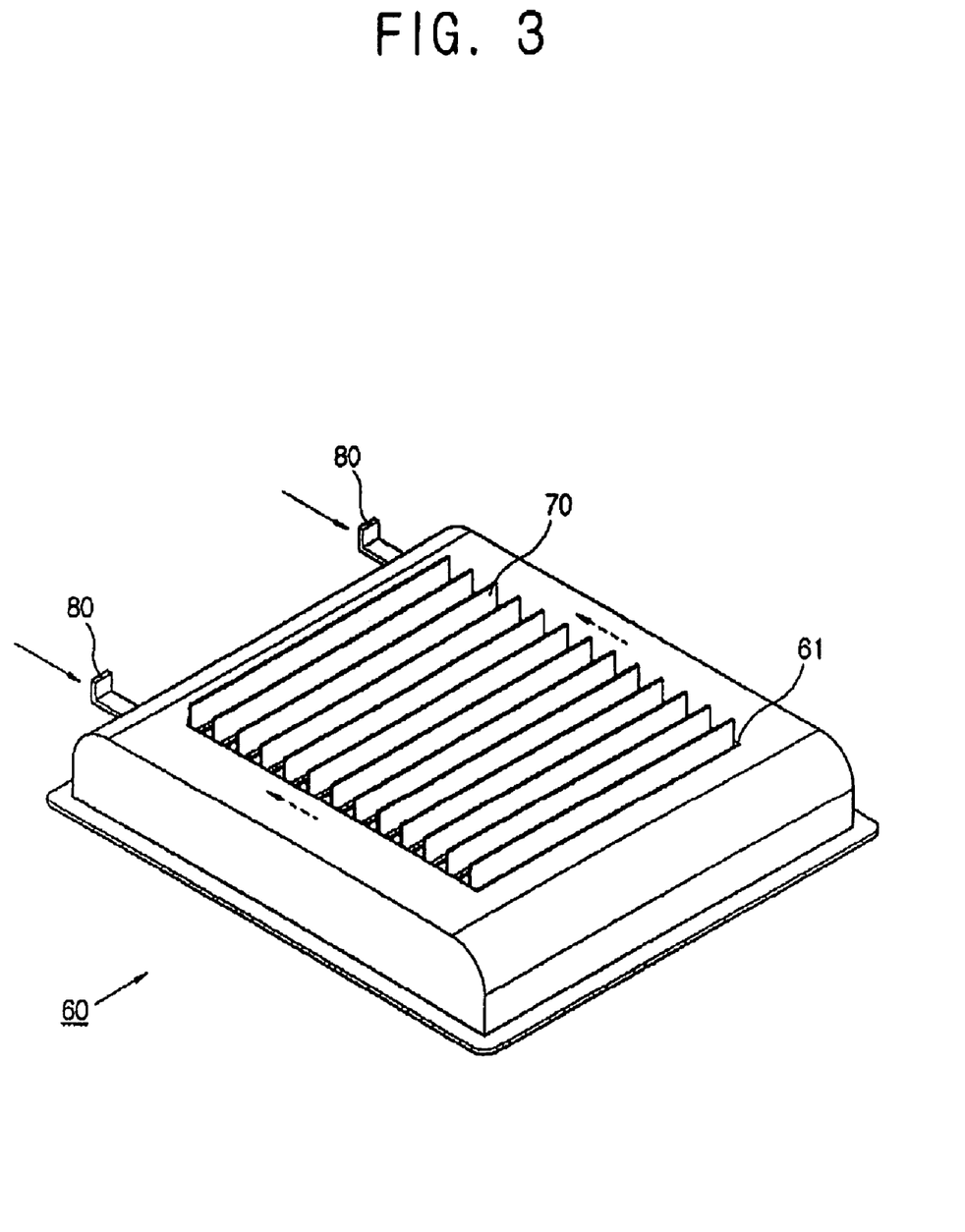
FIG. 3 illustrates the opening part of the cover member of the cooking apparatus shown in FIG. 1, in an opened state, according to an embodiment of the present invention.
Figure 4B:
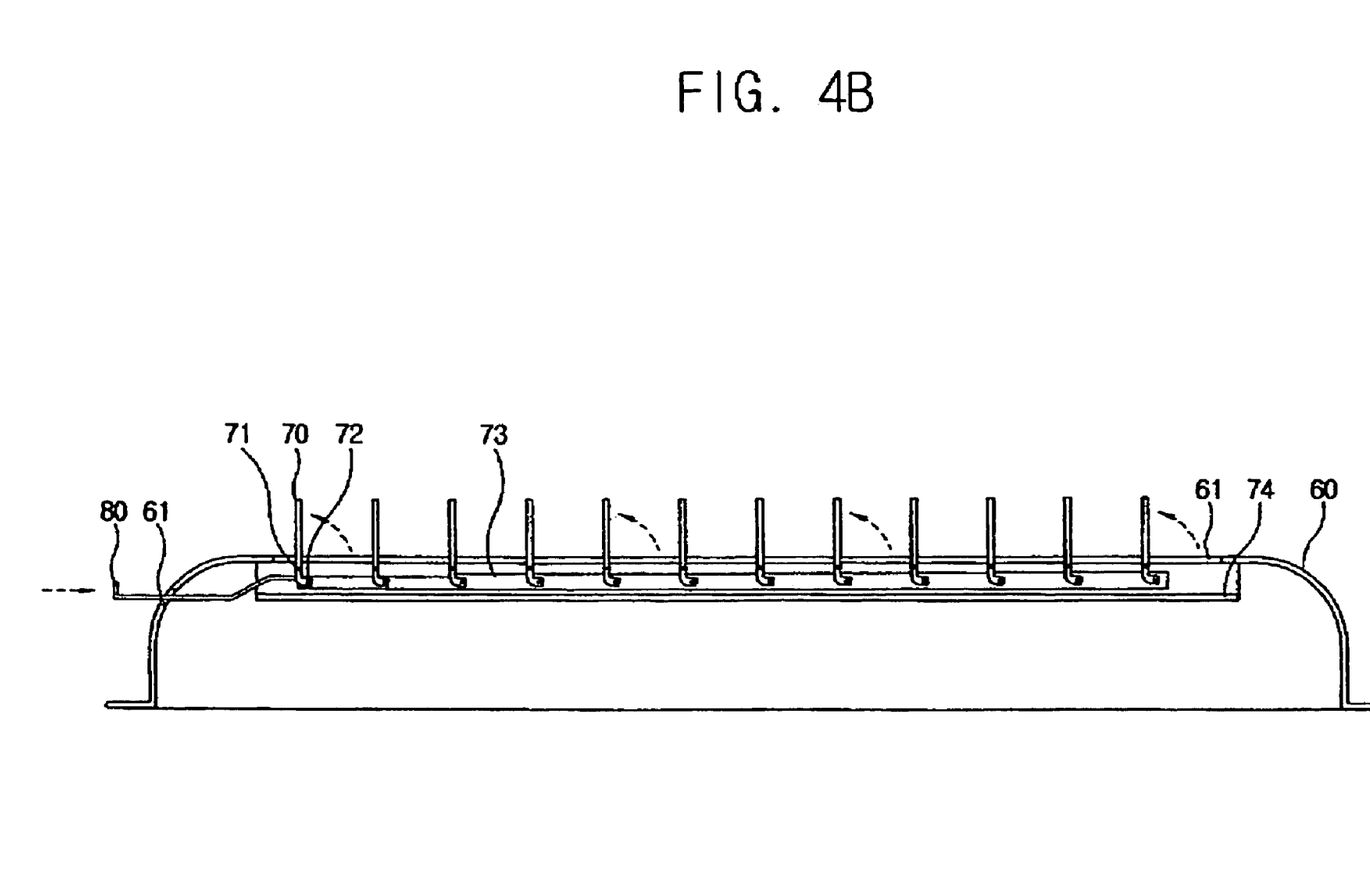

As shown in FIGS. 3 and 4B, if each manipulation knob 80 is pushed while cooking is continued, the blades 70 are rotated based on the rotation projection 71, and the sliders 73 connected by the coupling projection 72 are slid, whereby the plurality of blades 70 are erected relative to the cover member 60 and the opening part 61 of the cover member 60 is opened. Thus, the air generated and heated while cooking can be discharged externally through the opening part 61, and the user can also ascertain a cooking state of the food being cooked through the opened opening part 61.

That is, the user can easily open and close the opening part 61 by rotating the blades 70 with the use of each manipulation knob 80.

As described above, according to the present invention, the air generated and heated while cooking can be discharged externally because the opening part is opened by the opening and closing member, and the cooking state of the food inside the cooking apparatus can be ascertained, thereby enhancing the cooking efficiency by opening and closing the opening part.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A cooking apparatus having a grill part to cook food thereon, and a grill housing coupled with the grill part, the cooking apparatus comprising:

a cover member couplable with the grill housing, to cover the grill part, and having an opening part to discharge air from the cooking apparatus; and at least one opening and closing member coupled with the cover member, to open and close the opening part, the opening and closing member comprising a plurality of blades, wherein the cover member comprises:

pairs of support frames coupled with edges of the opening part, rotation supporting parts rotatably coupling ends of each blade with a pair of support frames, and an angle adjusting part comprising a pair of sliders slidably coupled with the support frames, and coupling parts, which are separate from the rotation supporting parts, the coupling parts coupling ends of each blade with the pair of sliders such that upon sliding the pair of sliders, the blades slide along with the pair of sliders and rotate via the rotation supporting parts, simultaneously.

2. The cooking apparatus according to claim 1, wherein the plurality of blades disposed in parallel at predetermined intervals.

3. The cooking apparatus according to claim 2, wherein the pair of support frames are coupled with edges of the opening part, to thereby center the opening part between the support frames.

4. The cooking apparatus according to claim 2, further comprising an electric heater generating heat to be used for cooking food,
wherein the plurality of blades are disposed in a direction of crossing the electric heaters.

5. The cooking apparatus according to claim 3, wherein each rotation supporting part comprises a plurality of rotation holes formed separately from each other along a lengthwise direction of the support frame, and rotation projections provided on each blade, being rotatably received in the rotation holes.

6. The cooking apparatus according to claim 5, wherein the angle adjusting part is connected to the plurality of blades, and adjusts a degree of inclination angle of each blade to the cover member.

7. The cooking apparatus according to claim 6, wherein the angle adjusting part further comprises a manipulation knob connected with each slider and manipulating the respective slider to slide.

8. The cooking apparatus according to claim 1, wherein the coupling part comprises a plurality of coupling holes formed separately from each other along a lengthwise direction of each slider, and a coupling projection provided on each blade, being inserted into the corresponding coupling hole.

9. A cooking apparatus having a grill part to cook food thereon, the cooking apparatus comprising:
   a cover member having opening part at a center thereof; and
   a sliding member positioned on a top portion of the opening part, to open and close the opening part, while cooking food on the grill part, the sliding member comprising a plurality of blades having ends rotatably coupled with edges of the opening part,
   the cover member comprising an angle adjusting part connected with each blade to adjust an angle of each blade, the angle adjusting part including a pair of sliders slidably coupled with the cover member, rotation supporting parts rotatably coupling ends of each blade to the cover member, and coupling parts coupling ends of each blade with the pair of sliders to adjust an angle of each blade such that upon sliding the pair of sliders, the blades slide along with the pair of sliders and rotate via the rotation supporting parts, simultaneously.

* * * * *